(12) United States Patent
Croix et al.

(10) Patent No.: US 6,862,600 B2
(45) Date of Patent: Mar. 1, 2005

(54) RAPID PARAMETER PASSING BETWEEN MULTIPLE PROGRAM PORTIONS FOR EFFICIENT PROCEDURAL INTERACTION WITH MINIMUM CALLS AND/OR CALL BACKS

(75) Inventors: John F. Croix, Austin, TX (US); Robert Gonzalez, Austin, TX (US)

(73) Assignee: Silicon Metrics Corporation, Austin, TX (US)

( * ) Notice: Subject to any disclaimer, the term of this patent is extended or adjusted under 35 U.S.C. 154(b) by 302 days.

(21) Appl. No.: 09/863,809

(22) Filed: May 22, 2001

(65) Prior Publication Data

US 2002/0183957 A1 Dec. 5, 2002

(51) Int. Cl.$^7$ .............................. G06F 17/00
(52) U.S. Cl. ................. 707/101; 707/102; 709/212; 709/213; 709/214
(58) Field of Search ............... 707/101, 102; 709/212, 213, 214, 310

(56) References Cited

U.S. PATENT DOCUMENTS

| | | | | |
|---|---|---|---|---|
| 6,173,388 B1 | * | 1/2001 | Abercrombie et al. | 712/22 |
| 6,408,423 B1 | * | 6/2002 | Khou et al. | 716/4 |
| 6,415,334 B1 | * | 7/2002 | Kanamori | 709/316 |
| 6,446,137 B1 | * | 9/2002 | Vasudevan et al. | 709/330 |
| 6,481,007 B1 | * | 11/2002 | Iyer et al. | 717/151 |
| 6,539,059 B1 | * | 3/2003 | Sriram et al. | 375/240.25 |
| 2001/0015464 A1 | * | 8/2001 | Tamaki | 257/393 |
| 2001/0034591 A1 | * | 10/2001 | Kawas et al. | 703/13 |

* cited by examiner

Primary Examiner—Nabil El-Hady
(74) Attorney, Agent, or Firm—Fulbright & Jaworski, LLP

(57) ABSTRACT

Systems and methods are described for rapid parameter passing. A method includes enumerating a set of parameters; providing an indication in a first set of arrays of whether to acquire from first program portion information associated with one or more parameters of the set of parameters, in response to a second program portion issuing a query t a third program portion for identifying the one or more parameters; populating a second et of arrays in an image of the first set of arrays with the information received from the first program portion associated with the one or more parameters, in response to a request from the second program portion; evaluating the third program portion by utilizing the information associated with the one or more parameters from the second set of arrays to derive an output from the third program portion for return to the second program portion; and conveying the output second program portion to the first program portion.

24 Claims, 9 Drawing Sheets

| ARC RULES | INPUT AT | | OUPUT AT |
|---|---|---|---|
| | PIN A | PIN B | PIN Y |
| AR0 | $A_{LH}$ | 1 | $Y_{HL}$ |
| AR1 | $A_{HL}$ | 1 | $Y_{LH}$ |
| AR2 | 1 | $B_{LH}$ | $Y_{HL}$ |
| AR3 | 1 | $B_{HL}$ | $Y_{LH}$ |

RAPID PARAMETER PASSING BETWEEN MULTIPLE PROGRAM PORTIONS FOR EFFICIENT PROCEDURAL INTERACTION WITH MINIMUM CALLS AND/OR CALL BACKS

BACKGROUND OF THE INVENTION

1. Field of the Invention

The invention relates generally to the field of computer science. More particularly, the invention relates to software. Specifically, a preferred implementation of the invention relates to parameter passing between multiple programs.

2. Discussion of the Related Art

Prior art techniques for exchanging data by passing parameters across multiple programs are known to those skilled in the art. However, there are several problems with these techniques.

One conventional approach to passing parameters between two programs involves one program reading the data of another and vice versa. A first program may make a "call" through an Application Program Interface (API) or a similar mechanism, to a second program. In response, the second program possibly using a "callback" reaches across to either the first program or another program to handle the call. However, many calls and callbacks may be performed to exchange data by passing parameters For instance, the first program may make a call to the second program and receive a dataset in return. Likewise, if the second program needs a particular data from the first program, in order to return the dataset to the first program, a callback may be performed for that purpose. Such a process of calls and callbacks may continue until all the desired data is exchanged through parameter passing. However, a significant amount of unnecessary time and resources may be wasted to accomplish the desired data exchange or to discover one program may not have what another program is seeking therefrom.

One unsatisfactory approach to addressing these issues involves providing all the parameters required for evaluating a rule, such as a function of a relatively large number of variables, to derive an output. However, in order to evaluate the function, it can be inefficient to pass all the parameters to the function, which selectively utilizes the needed parameters for a selected set of variables.

Another unsatisfactory approach to addressing these issues involves loading an arbitrary number of parameters on a stack. However, such parameter passing to exchange data between multiple programs or processes requires each program or process to be aware of the order and type of the parameters, thereby substantially slowing down the process of passing parameters off the stack.

More specifically, it can be difficult to provide efficient parameter passing, in a variety of environments, including databases and libraries. For example, within an environment having disparate applications, while using a known Application Procedural Interface (API) with a set of predefined callbacks or calling routines, absent a protocol specification, it could be difficult to provide an efficient parameter passing between a single shared entity.

In the semiconductor industry, multiple installed application programs such as software products for electronic design automation may interface with a loader interacting with a model including one or more rules. Integrated circuits (ICs) using deep submicron process have led to the development of an open architecture named Open Library API (OLA). Although OLA provides a comprehensive Application Procedural Interface (API) that can be used by Electronic Design Automation (EDA) tools for the determination of cell and interconnect timing and power characteristics of ICs, performing unnecessary procedures such as calls and/or callbacks, providing all the variables required for evaluating a rule, or use of a stack can cause significant degradation of system performance.

Therefore, as every call or callback between two communicating programs will most likely require a finite amount of time and resources, a relatively large overhead may be involved while exchanging data through parameters. Additionally, if many calls or callbacks are involved, a lot of custom programming may be needed. Even worse, if there is logic or data changes in one program, the interaction for exchanging data through parameters will probably need more custom programming.

What is needed is a solution that permits efficient parameter passing to implement for example, a model having one or more rules, which serve multiple applications. More particularly, a solution is desired for evaluation of a rule which calculates and/or models electrical characteristics, including but not limited to, delay, power, and other silicon device characteristics, without incurring excessive overhead.

SUMMARY OF THE INVENTION

A goal of the invention is to provide a technique directed to rapid parameter passing for efficient procedural interaction (e.g. minimize calls and/or callbacks) between a program having a generic set of utilities or rules that are not locked to a single application. A yet another goal is to satisfy the above-discussed requirement of the efficient procedural interaction while either evaluating a single parameter or multiple parameters.

One embodiment of the invention is based on a method, comprising: enumerating a set of parameters; providing an indication in a first set of arrays of whether to acquire from a first program portion an information associated with one or more parameters of the set of parameters, in response to a second program portion issuing a query to a third program portion for identifying the one or more parameters; populating a second set of arrays in an image of the first set of arrays with the information received from the first program portion associated with the one or more parameters, in response to a request from the second program portion; evaluating the third program portion by utilizing the information associated with the one or more parameters from the second set of arrays to derive an output from the third program portion for return to the second program portion; and conveying the output from the second program portion to the first program portion.

Another embodiment of the invention is based on a method, comprising: enumerating a parameter block having a first plurality of parameters for selectively filling a first data structure and a second data structure and a second plurality of parameters for selectively filling the first data structure and the second data structure, both the first data structure and the second data structure having an index order such that said first data structure is a mapped image of said second data structure, wherein both the first data structure and the second data structure includes a first plurality of arrays and a second plurality of arrays; providing a first indication in the first plurality of arrays of said first data structure of whether to acquire from a first program portion a dataset associated with said first plurality of parameters, in response to one or more queries being issued from a second program portion to a third program portion for identifying the first plurality of parameters; providing a second indication in the second plurality of arrays of said first data structure for identifying said second plurality of parameters to the second program portion, in response to receipt of said one or more queries at the third program portion; populating the first plurality of arrays of said second data structure with the dataset, in response to one or more transactions performed between the first and second program portions; evaluating the third program portion by utilizing the dataset and the second indication to derive an output data from the third program portion for return to the second program portion; populating the second plurality of arrays of said second data structure with the output data received from the third program portion; and extracting the output data from the second plurality of arrays of said second data structure for return to the first program portion.

Another embodiment of the invention is based on a method for evaluating a rule, comprising: querying said rule to determine one or more requirements that need to be fulfilled by data such that said rule can be evaluated; utilizing a parameter block interface having one or more fields for passing the data to the rule; and filling the one or more fields of said parameter block interface dynamically responsive to the one or more requirements of said rule.

Another embodiment of the invention, an apparatus for evaluating a rule, comprising: an interrogator for querying said rule to determine one or more requirements including parameters that need to be fulfilled by data such that said rule can be evaluated; a parameter block interface having one or more fields for passing the data to the rule; and an evaluator for dynamically filling the one or more fields of said parameter block interface responsive to the one or more requirements determined from said rule.

Other embodiments of the invention are based on an electronic media, comprising a program for performing the foregoing methods. Other embodiments of the invention are based on a computer program, comprising computer or machine readable program elements translatable for implementing the methods. Other embodiments of the invention are based on an integrated circuit designed in accordance with the foregoing methods.

These, and other, aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference numerals designate the same elements. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail.

The context of the invention can include semiconductor design synthesis tools. The context of the invention can also include the support and operation of a timing analyzer. In general, using a parameter block interface, a generic set of utilities which are not locked to a single application program can be developed to serve a variety of software products deployed for electronic design automation (EDA).

A first program may be an application program for electronic design automation. A second program may be a shared object library having a generic code for use with the first program. Alternatively, the second program could be a dynamic link library. The second program may employ a plug-in for use with the first program. A third program may comprise a set of utilities as non-application specific shared objects; each non-application specific shared object having one or more macros or rules for use with the first program. Alternatively, the third program could be a plurality of non-application specific dynamic link libraries, each application specific dynamic link library having one or more macros or rules for use with the first program. For example, the third program may be an active model having a generic set of utilities. The generic set of utilities can be readily shared by the programs through the use of the parameter block interface.

Figure 1:
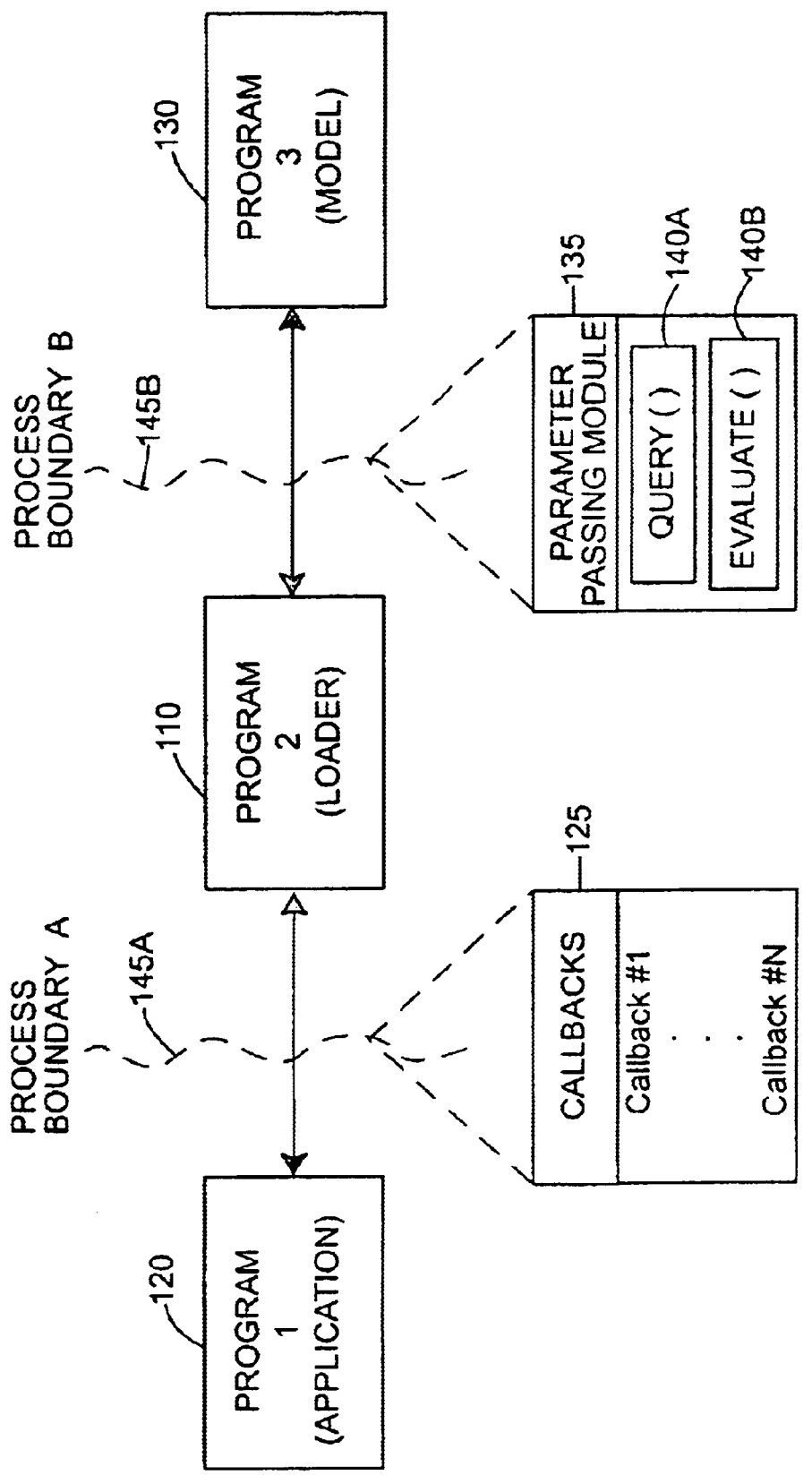
FIG. 1 illustrates a high-level block schematic view of a system consistent with an embodiment of the invention.

An overview of a system 100 that includes an embodiment of the invention will now be described. Referring to FIG. 1, a loader 110 can be coupled to an application program 120 via an application procedural interface (API) comprising callbacks 125. The loader 110 can load a model 130 comprising one or more rules such as functions. The model 130 may be utilized by the application program 120 through a parameter passing module (PPM) 135 for passing parameters and results to evaluate information concerning the electrical properties of some/many/all of the cells and/or interconnects in a design of interest.

In alternative embodiments, the invention can be implemented with an application procedural interface that does not utilize callbacks. The invention is not limited to use in a context that includes calls and/or callbacks.

The PPM 135 provides an interface for communication between the application program 120 and model 130 via loader 110. The loader 110 and model 130 could each be, for example, a shared object (.so) or a dynamic link library (.dll) which is generally utilized as a software module being invoked and subsequently executed at runtime for the application program 120. For example, loader 110 and model 130 could be in different formats such as shared object libraries in UNIX platform or dynamic link libraries in WINDOWS platform.

In an alternative embodiment, the loader could be part of the application program itself. Further, the three components (i.e., program, model and loader) can be linked (coupled) together to form a single application. Consider a software group within a company that creates utility modules for distribution throughout the company. They may not want to be limited to an API defined by any single application. They can use this parameter block to isolate their code from specific APIs. These utility modules could be other modules linked into the application (i.e., not a shared library or dll). In these alternative embodiments, the loader can be termed an API converter. This API converter communicates with the utilities.

The invention can include additional APIs in the parameter block. The invention can include a parameter block that supports multiple voltages.

The invention can includes a PPM 135 which comprises functions or routines such as a query call 140A and an evaluate call 140B that can be utilized for passing parameters and results including industry standard and proprietary parameters. For example, using callbacks 125, parameters and results may be exchanged between the loader 110 and the application program 120 across a process boundary A 145A. Likewise, making the query call 140A and the evaluate call 140B, parameters and results may be exchanged between the loader 110 and the model 130 across a process boundary B 145B.

A generic set of utilities may be provided within the model 130, which a group of programmers may not want to lock to a particular single program (e.g., the application program 120). The group of programmers may use the loader 110 to perform the query call 140A on the model 130 to determine what data the model 130 needs. Once the desired data is acquired from the application program 120, the model 130 may proceed to provide an answer. In particular, the evaluate call 140B may be used to get the answer form the model 130 for return to the loader 110 which is further passed to the application program 120. In this manner, a group of programmers being assigned to work on a shared project may specify their interface.

However, it is to be understood that the way in which the loader 110 obtains data from the application program 120 may not employ callbacks 125. For example, the loader 110 could deploy any procedural interaction mechanism to communicate to the application program 120; therefore, the invention may not be construed as just limited to the use of callbacks 125. Also, those skilled in the art will recognize that the loader 110 and the application program 120 may actually be portions of a single program. For that matter, all three programs including the model 130 could be portions of a single program.

From the application program 120 perspective, the loader 110 provides the procedural interaction to the model 130. Accordingly, the loader 110 includes an operable interface with the application program 120 to guide the registration and calculation of values within the model 130. In one embodiment, the model 130 may be for both pre- and post-layout design flows.

Figure 2:
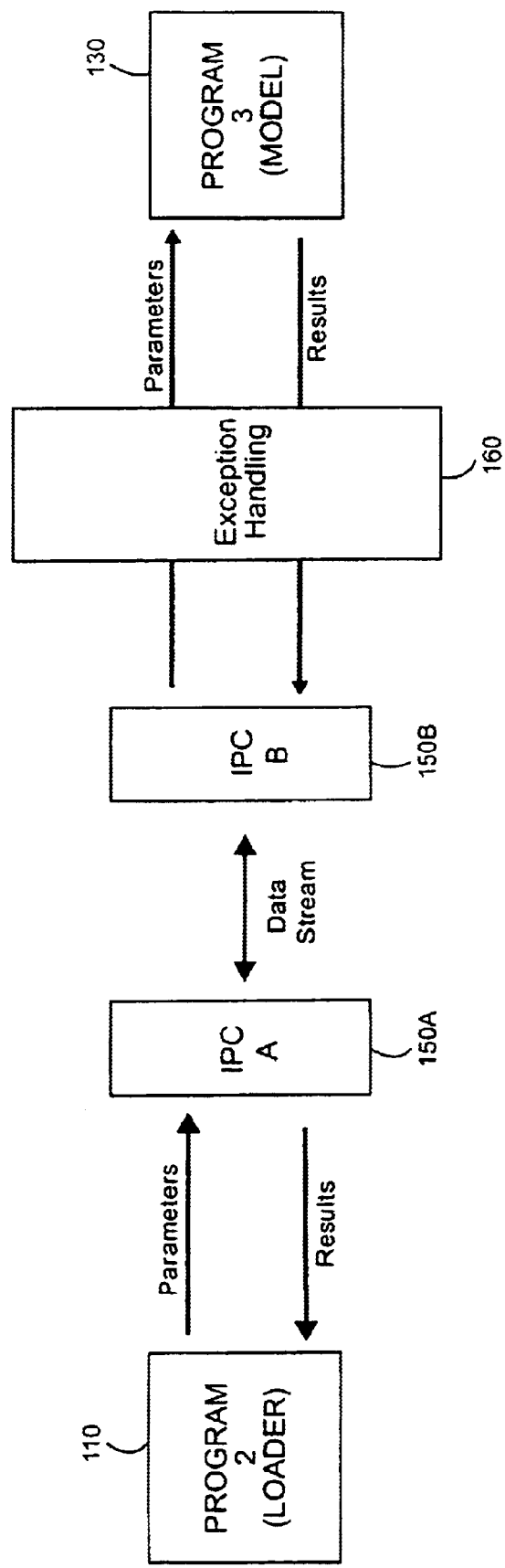
FIG. 2 illustrates a portion of the system of FIG. 1 with exemplary detail.

FIG. 2 illustrates a portion of the system 100 of FIG. 1 with exemplary detail. More specifically, a parameter passing architecture consistent with the invention for interaction between the loader 110 and the model 130 is illustrated. Of course, persons skilled in the art will recognize a variety of parameter passing architectures may be contemplated for a desired application. Inter-process communication (IPC) layers 150A and 150B may be included to provide a data stream between the loader 110 and the model 130. To separate process execution, an exception-handling feature 160 can be included for a particular application program (not shown) requiring a corresponding rule (not shown) from the model 130. The exception-handling feature 160 may provide a process protection between the particular application program and the corresponding rule by isolating the process interaction. In operation, one or more parameters may be passed from the loader 110 to model 130 and computed results responsive to the parameters can be provided back to the loader 110 for return to the particular application program.

The IPC A 150A, IPC B 150B and exception handling 160 are not necessarily needed. These features which can be implemented but are not required for operation.

Figure 3:
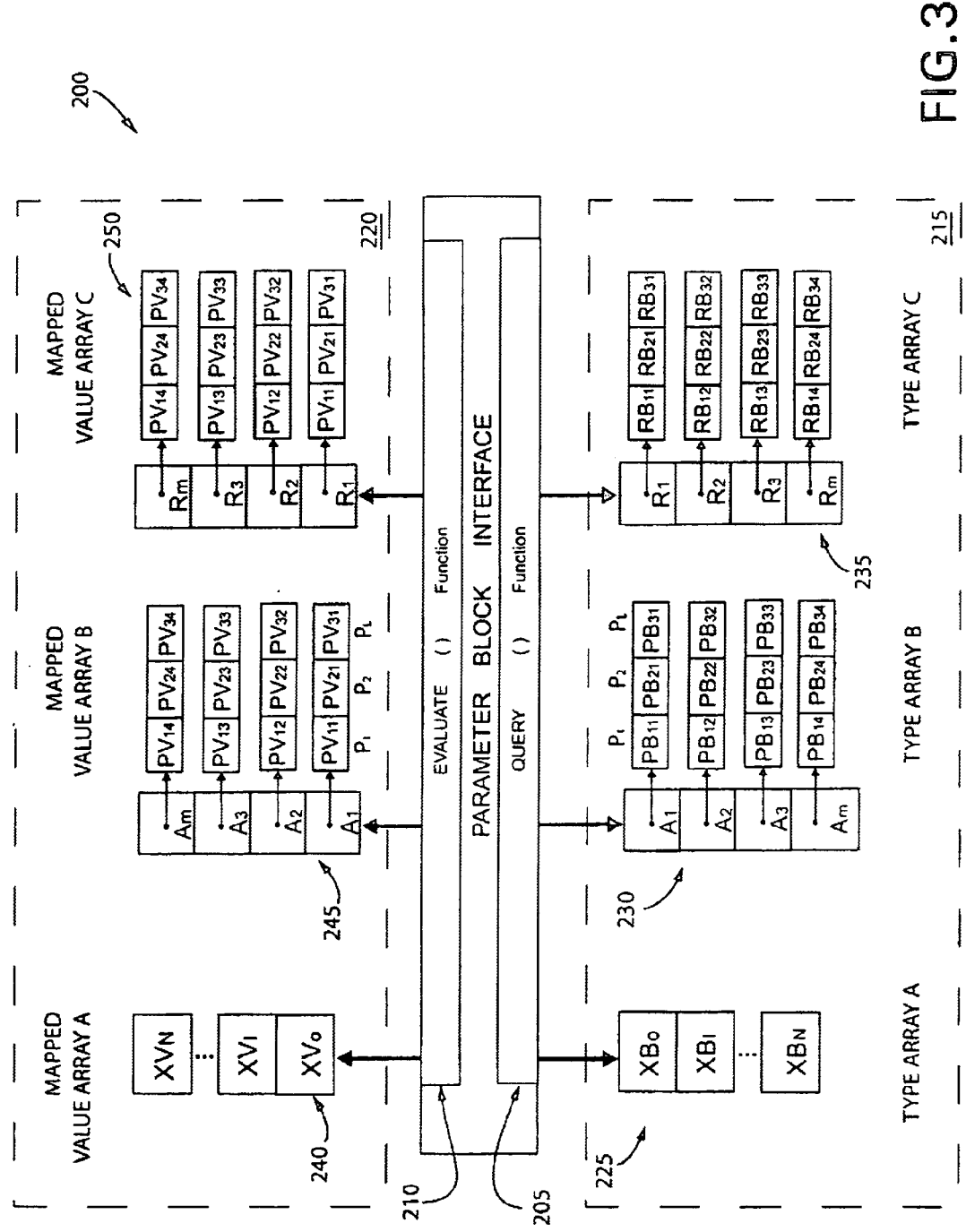
FIG. 3 illustrates an exemplary parameter block interface that can be implemented by a computer program for providing rapid parameter passing in the system of FIG. 1.

FIG. 3 illustrates a parameter block interface (PBI) 200 that can be implemented by a computer program for providing rapid parameter passing in the context of the system of FIG. 1. The PBI 200 includes a query ( ) function 205 to determine one or more required parameters to be passed and an evaluate ( ) function 210 to calculate a result from the passed one or more required parameters. The PBI 200 includes a first set of type arrays 215 to store types of a set of enumerated parameters and a second set of value arrays 220 for storing corresponding values of the set of enumerated parameters. Both the first set of type arrays 215 and the second set of value arrays 220 define an index order such that the second set of value arrays 220 is a mapped image of the first set of type arrays 215. More specifically, the first set of type arrays 215 includes a type array A 225, a type array B 230 and a type array C 235. Likewise, the second set of value arrays 220 includes a mapped value array A 240 corresponding to the type array A 225, a mapped value array B 245 corresponding to the type array B 230 and a mapped value array C 250 corresponding to the type array C 235.

Of course, the invention is not limited to the shape of the parameter block shown in FIG. 3. The invention can include additional arrays, including control arrays. For example, there might be a variable in the parameter block which gives the value of "m" in the array or "N" in the array (m and N being the sizes as indicated by the subscripts).

Figure 4:
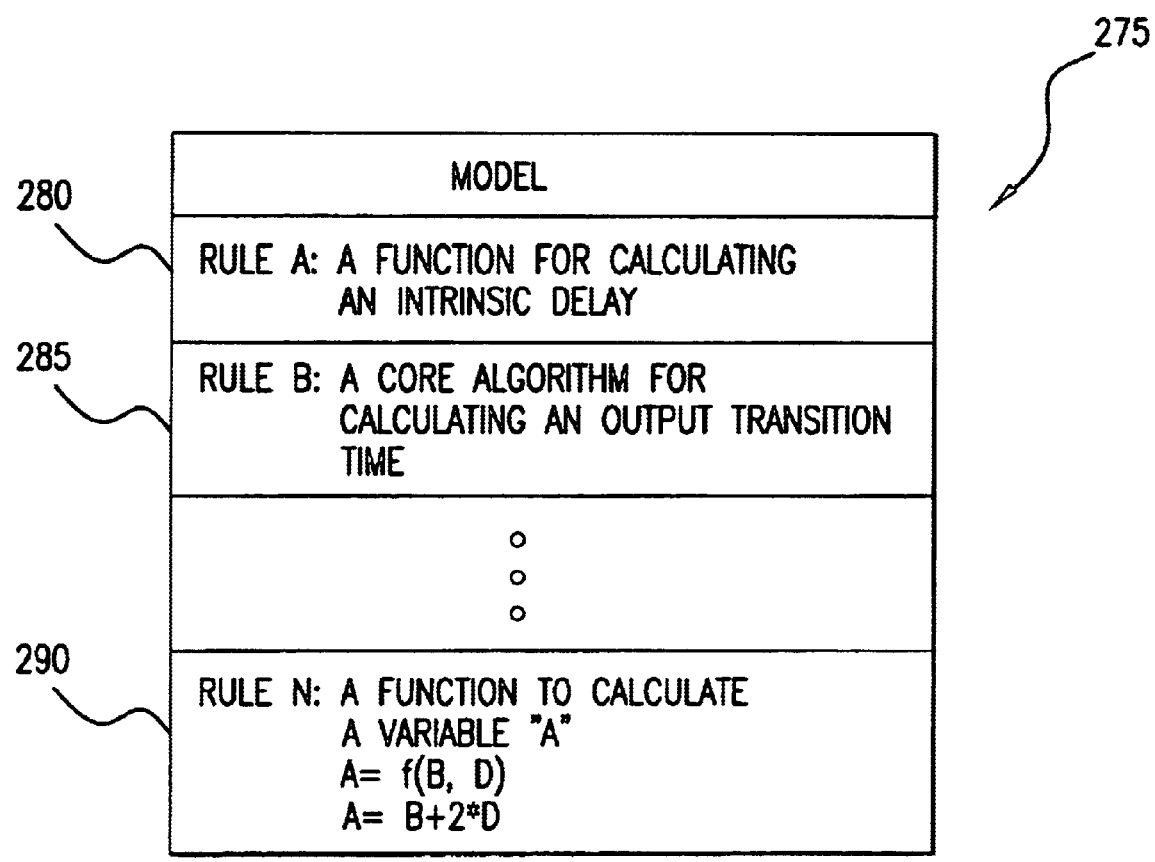
FIG. 4 illustrates an exemplary model having a plurality of rules consistent with an embodiment of the invention.

FIG. 4 illustrates an exemplary model 275 having a plurality of rules consistent with an embodiment of the invention. As shown, the exemplary model includes a rule A 280, a rule B 285 and a rule N 290. In particular, the rule A 280 is a function for calculating an intrinsic delay and the rule B 285 is a core algorithm for calculating an output transition time. Likewise, the rule N 290 is a function to calculate a variable "A" as a function of two parameters "B" and "D."

Figure 5:
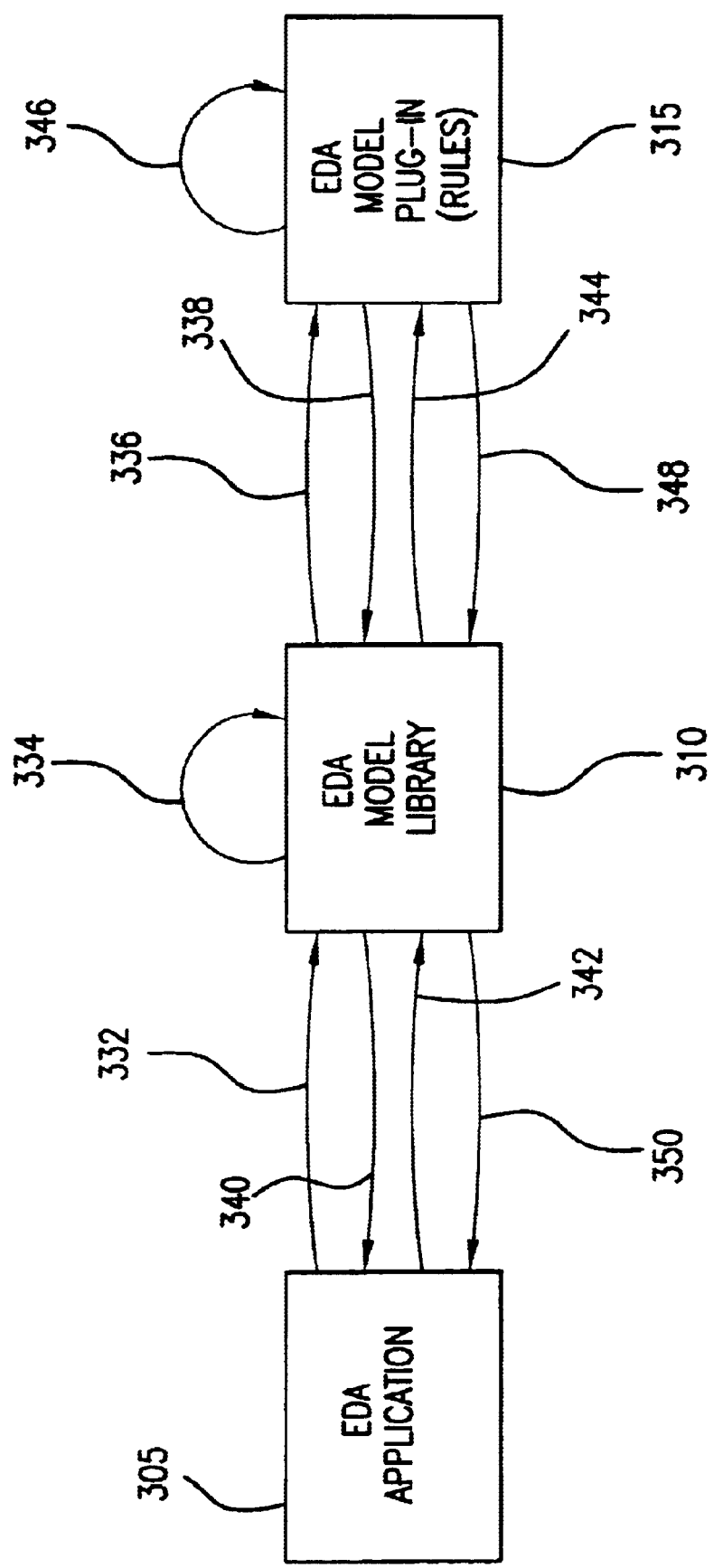
FIG. 5 illustrates exemplary interactions between an application, a loader, and a model for providing rapid parameter passing that can be implemented by a computer program through the exemplary parameter block interface of FIG. 2 in the system of FIG. 1 while evaluating a rule from the exemplary model of FIG. 4.

FIG. 5 illustrates exemplary interactions between an EDA (Electronic Design Automation) application 305, an EDA model library 310, and an EDA model plug-in 315 which could utilize rapid parameter passing as implemented by a computer program through the parameter block interface 200 of FIG. 2 in the system 100 of FIG. 1 while evaluating the rule N 290 from the exemplary model 275 of FIG. 4.

Referring to FIGS. 3 through 5, the EDA application 305 communicates with the EDA model plug-in 315 through the EDA model library 310 utilizing the PBI 200. The PBI 200 is generally used to evaluate one or more parameters either for a single element or for a plurality of elements. The EDA application 305 communicates with the EDA model library 310 utilizing one or more transactions. These transactions can include calls. In particular, the EDA model library 310 communicates with the EDA model plug-in 315 through at least one query call utilizing the query ( ) function 205 and at least one evaluate call utilizing the evaluate ( ) function 210. In one embodiment, the EDA model library 310 communicates with the EDA model plug-in 315 through one or more query and evaluate calls in a shared workspace.

With reference to FIGS. 3 through 5, the EDA application 305 can make a call to the EDA model library 310 and may communicate with the EDA model plug-in 315 through the EDA model library 310 utilizing the parameter block interface 200. In step 332, the EDA application 305 makes a call the EDA model library 310 asking for a variable "A." Upon receipt of the call, the EDA model library 310 finds the rule N 290 for calculating the variable "A" in step 334. The variable "A" is identified in the first set of type arrays 215 as a required result. To calculate the variable "A," in step 336, the EDA model library 310 issues a query to the EDA model plug-in 315 via the query ( ) function 205 of PBI 200 asking the plug-in 315 for the required input parameters. Using the rule N 290, the EDA model plug-in 315 responds to the query by identifying parameters "B" and "D" as required inputs in step 338. The variables "B" and "D" are identified in the first set of type arrays 215 as required inputs. In step 340, the EDA model library 310 performs one or more callbacks to the EDA application 305 for acquiring the parameters "B" and "D." Responsive to such callbacks, in step 342, the EDA application 305 provides to the EDA model library 310 the parameters "B" and "D." If "B" and "D" are not available, the process will terminate. "B" and "D" are written into the second set of value arrays 220 at addresses that correspond to the addresses in the first set of the type arrays 215 where they were identified as being required inputs. Hence, the actual values of "B" and "D" are mapped into the second set of value arrays 220 in an image of the manner in which they were identified as being required. Then, the parameters "B" and "D" are passed to the EDA model plug-in 315 at step 344 via the evaluate 0 function 210 of PBI 200. At step 346, the EDA model plug-in 315 utilizes the parameters "B" and "D" to evaluate the variable "A" using the rule N 290. The result is written into the mapped value array C 250 of the second set of value arrays 220. In step 348, the EDA model plug-in 315 returns the variable "A" to the EDA model library 310 for further passing it on to the EDA application 305 at step 350.

The identity of the required parameters is specified in the first set of type arrays 215. These parameters include required inputs, which are identified in the type array A 225 and the type array B 320, and required outputs, which are identified in the type array C 235. More particularly, providing the indication includes setting a respective flag to either a first value or a second value in the first set of type arrays 215 for each of the set of parameters. The first value indicates to seek the information associated with that parameter, the second value indicates not to seek the information associated with that parameter. Populating with information includes writing a value obtained from the EDA application 305 or the plug-in 315 into the second set of value arrays 220 at an address that is mapped in an image of the flag having the first value for that parameter.

In one embodiment, the EDA model plug-in 315 includes the model 275 having a plurality of rules for use with the EDA application 305. Persons skilled in the art will appreciate that EDA model library 310 maybe a shared object. For example, the EDA model library 310 being a shared object library with extension ".so" refers to a UNIX based shared library which allows dynamically loadable executable content. However, other forms are possible including a dynamic link library with the extension ".dll" in a WINDOWS environment. The EDA model library 310 can load the EDA model plug-in 315. The EDA model plug-in 315 can include data and algorithms to provide dynamic content and interfaces to OLA-enabled application programs. It is to be understood that the parameter passing mechanism through the optimized use of the PBI 200 enables fast cell and net delay calculations to provide relatively faster timing closure for rapid design convergence. As a result, the EDA model library 310 and the EDA model plug-in 315 can facilitate relatively faster delay and/or power calculations or modeling for both cells and interconnects to compute delay and power for any given environment in a design flow.

In one embodiment, a C++ class-based PBI 200 is generally provided for speed and extensibility. Moreover, all library functions are coded in C++ as well. EDA model plug-in 315 to the EDA model library 310 provides dynamic adaptation of algorithmic content for handling both cell and net (stage delay). Both pre-and post-layout models are supported. The pre-layout models use wireload information and the post-layout models use extracted network interconnect, instance specific data. For example, model Plug-ins to an OLA-enabled compiled library can embed vendor's data and algorithms. Data can be in any form as long as the algorithm can consume it. For model plug-ins, C++ inheritance from a known object oriented class base is used to simplify development and runtime use. The OLA-enabled compiled library is a shared library and comprises library content as a C++ based executable module which is portable to an OLA-enable application. A wire load model as a shared object library representing the wireload models may also be employed with a companion LIB providing pin attributes and functions.

The term coupled, as used herein, is defined as connected, although not necessarily directly, and not necessarily mechanically. The term program or phrase computer program, as used herein, is defined as a sequence of instructions designed for execution on a computer system. A program may include a subroutine, a function, a procedure, an object method, an object implementation, an executable application, an applet, a servlet, a source code, an object code, and/or other sequence of instructions designed for execution on a computer system.

While not being limited to any particular performance indicator or diagnostic identifier, preferred embodiments of the invention can be identified one at a time by testing for the presence of speed and flexibility. The test for the presence of speed can be carried out without undue experimentation by the use of a simple and conventional benchmark study to quantify the time required to transfer a sample set of parameters. The test for the presence of flexibility can be carried out without undue experimentation by adding a new parameter and then ensuring that the expanded set of parameters are all passed successfully. Preferred embodiments of the invention will continue to operate when a new parameter is enumerated.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Figures 6A, 6B:
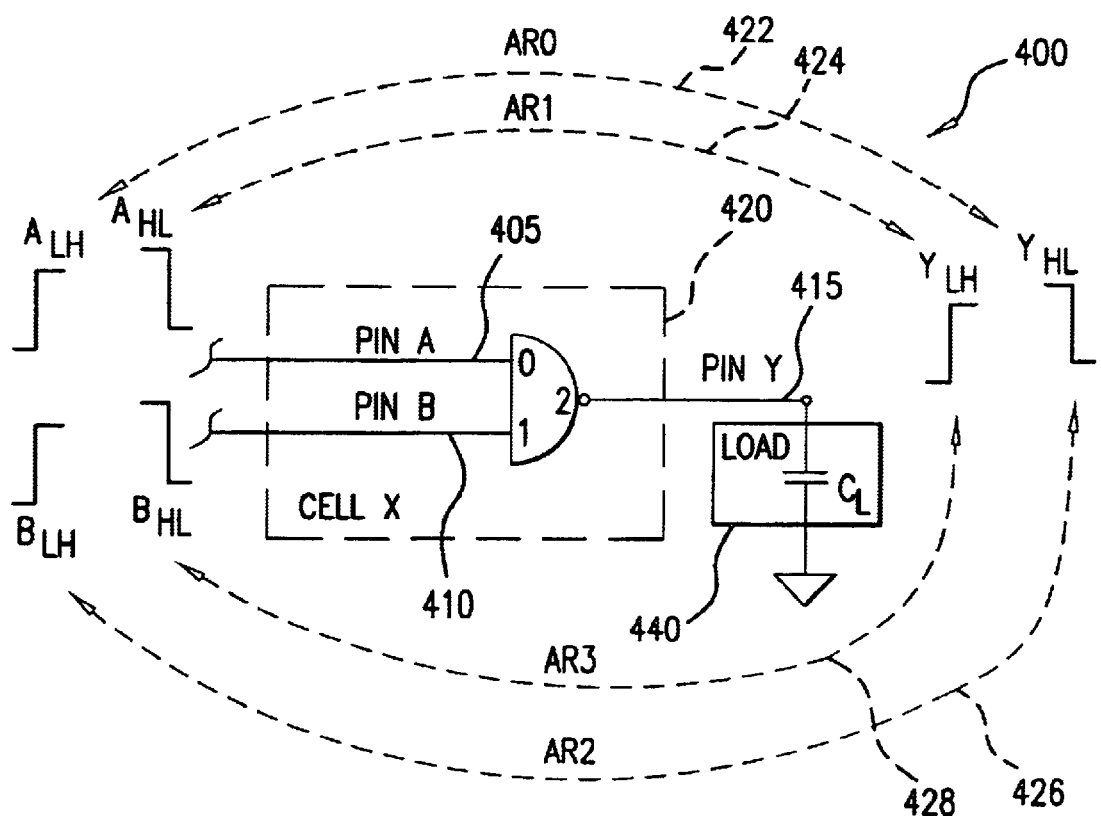
FIG. 6A illustrates an exemplary circuit under test for a timing analysis consistent with an embodiment of the invention.
FIG. 6B illustrates exemplary rules for the timing analysis of the exemplary circuit of FIG. 6A.

FIG. 6A illustrates an exemplary circuit 400 under test for a timing analysis consistent with an embodiment of the invention. FIG. 6B illustrates exemplary rules for the timing analysis of the exemplary circuit 400 of FIG. 6A. Referring to FIGS. 6A and 6B, typically, there can be a variety of relationships between input pin A 405, pin B 410 and an output pin Y 415 of a cell X 420 for timing or power characteristics. In the illustrated example, four timing arcs AR0 422, AR1 424, AR2 426 and AR3 428 are included. Each timing arc defines a timing relationship between the input pin A and pin B and the output pin Y (for example, an input signal $A_{LH}$ transitions from a low level, 0V termed as "bit 0" to a high level, 5V termed as "bit 1"). A rule may be associated with each timing arc. Alternatively, one rule may be associated with all the four timing arcs AR0 through AR3, 422 through 428. This one-to-many association may be useful in an EDA application program such as a static timing analyzer. For example, in a static timing analysis run, input transition times may be devised at all inputs pin A 405, pin B 410 before evaluating delay at the output pin Y 415 with a load 440.

Figure 7:
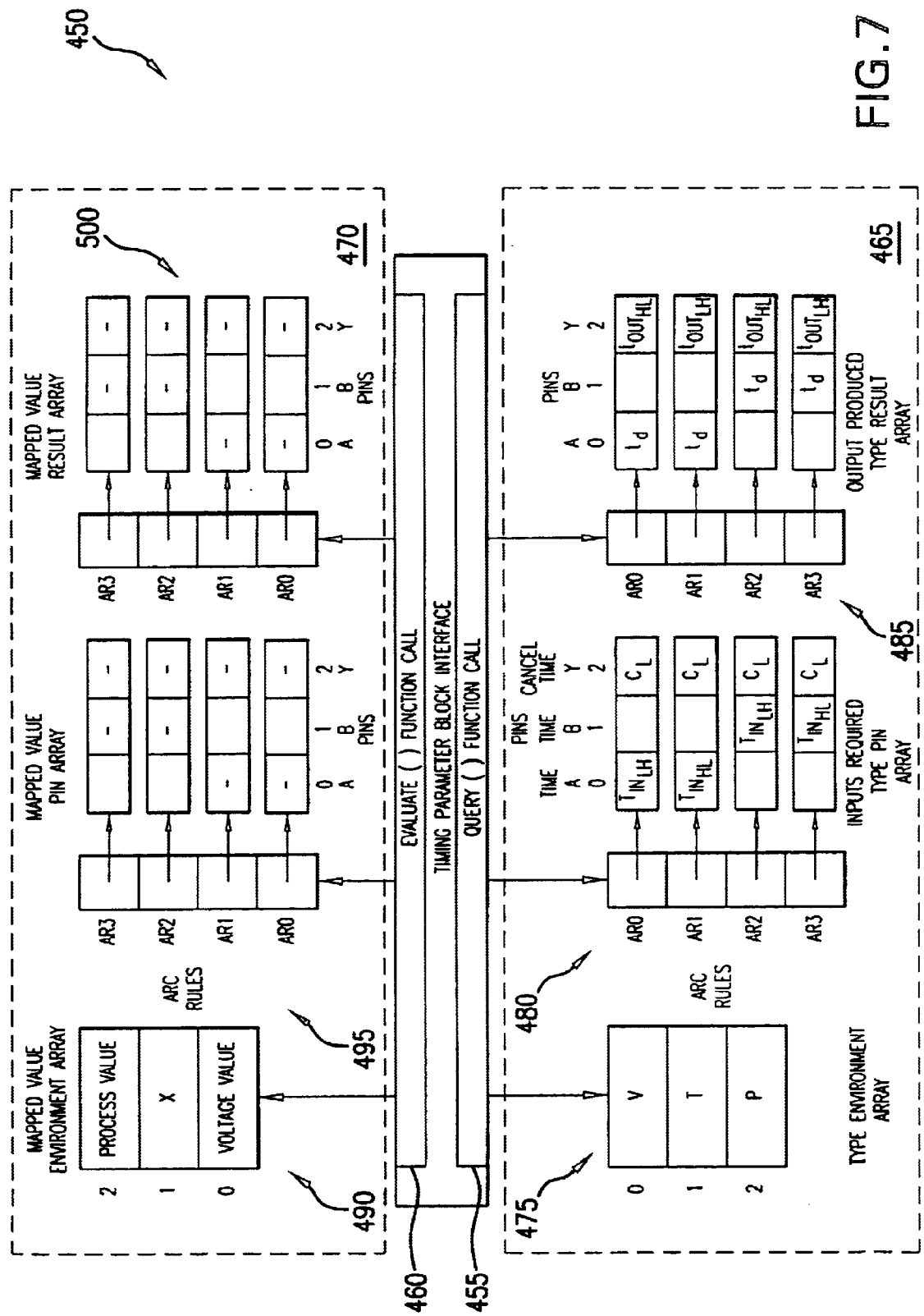
FIG. 7 illustrates an exemplary timing parameter block interface that can be implemented by a computer program for providing rapid parameter passing while performing the timing analysis of the exemplary circuit of FIG. 6A.

FIG. 7 illustrates an exemplary timing parameter block interface (TPBI) 450 that can be implemented by a computer program for providing rapid parameter passing while performing the timing analysis of the exemplary circuit 400 of FIG. 6A. The TPBI 450 comprises a query ( ) function call 455 to determine the required parameters to be passed and an evaluate ( ) function call 460 to calculate a result from the passed required parameters. The TPBI 450 further comprises a first data structure 465 and a second data structure 470. Both the first data structure 465 and the second data structure 470 define an index order such that the second data structure 470 is a mapped image of the first data structure 465. The first data structure 465 includes a first plurality of arrays. The second data structure 470 includes a second plurality of arrays. Specifically, the first plurality of arrays includes a type environment array 475, a type pin array 480 and a type result array 485. The second plurality of arrays includes a mapped value environment array 490 corresponding to the type environment array 475, a mapped value pin array 495 corresponding to the type pin array 480 and a mapped value result array 500 corresponding to the type result array 485.

With reference to FIGS. 5, 6A, 6B and 7, in operation, a parameter block having a first plurality of parameters for selectively filling the first data structure 465 and a second plurality of parameters fro selectively filling the second data structure 470 is enumerated. In response to one or more queries being issued from the EDA model library 310 to the EDA model plug-in 315, a first indication is provided in the first plurality of arrays of the first data structure 465 of whether to acquire from the EDA application 305 a dataset associated with the first plurality of parameters. Responsive to one or more transactions performed between the EDA application 305 and the EDA model library 310, the second plurality of arrays of the second data structure 470 is populated with the dataset. Then the EDA model plug-in 315 is evaluated by utilizing the dataset and the second indication to derive an output data from the EDA model plug-in 315 for return to the EDA model library 310. The second plurality of arrays of the second data structure 470 is populated with the output data received from the EDA model plug-in 315. Finally, the output data is extracted from the second plurality of arrays of the second data structure 470 for return to the EDA application 305.

Generally, a well-known set of types and values of parameters may be needed in order to evaluate a particular rule. For example, a rule can be evaluated in a controlled environment having a predetermined set of parameters. In EDA, as a finite set of known parameters may be needed for a rule to evaluate a particular function, thereby such a finite set of known parameters can be readily enumerated prior to an evaluation process. For example, for evaluating a typical timing rule, an EDA tool may employ a fixed or limited set of parameters, including but not limited to, a voltage parameter (V), a process parameter (P) a temperature parameter (T), an input transition time parameter ($T_{in}$), a capacitance load parameter ($C_L$). One EDA tool for example, employs up to 30 parameters to perform delay calculations utilizing a rule algorithm. As an example, the EDA tools may utilize the input transition time parameter ($T_{in}$) at the input pin A 405; the load 440 across the output pin Y 415, or the temperature parameter (T) for a particular cell X such as the cell X 420.

As an example, a rule in the EDA model plug-in 315 may evaluate all the timing arches AR0 through AR3, 422 through 428 or each input transition time and corresponding output transition time may be determined. For example, to perform a conventional slew rate calculation at the input pin A 405, a set of five parameters including the temperature parameter (T), the voltage parameter (V), the process parameter (P), the input transition time parameter ($T_{in}$) and the capacitive load parameter ($C_L$) may be desired. Therefore, to evaluate one timing arch at a time would require five parameters times the four timing arches, AR0 through AR3, 422 through 428 resulting in 20 evaluations to get 20 parameters. However, when all the timing arches AR0 through AR3 are grouped together, knowing only the input transition time parameter ($T_{in}$) in the timing arch at issue is changing, only 8 parameters may be evaluated.

As, T, V, P, $C_L$ are evaluated only once and four different input transition time parameters ($T_{in}$) for respective timing arches AR0 through AR3, 422 through 428, therefore, the invention can rapidly pass data either for one timing arch at a time or grouped data may be passed concurrently for multiple timing arches. Accordingly, a single rule can evaluate either one timing arch or evaluate multiple timing arches, thereby enabling rapid passing of parameters.

In a preferred embodiment, the TPBI 450 is implemented using object-oriented programming techniques. The following Table 1 contains C++ pseudocode that describes rapid parameter passing.

TABLE 1

```
class BaseRule;
class ParameterBlock : virtual public BaseObject
    {
    public:
    enum PIN_PARM_TYPE      {
                            NO_PIN_PARM=0,
                            TIN_PIN_PARM=1,
                            CLOAD_PIN_PARM=2,
                            TIN_REFERENCE_PIN_PARM=3,
                            TIN_SIGNAL_PIN_PARM=4,
                            LAST_PIN_PARM=5 };
    enum ENV_PARM_TYPE      {
                            NO_ENV_PARM=0,
                            VOLTAGE_ENV_PARM=1
                            TEMP_ENV_PARM=2,
                            PROCESS_ENV_PARM=3
                            LAST_ENV_PARM=4 };
    enum RESULT_TYPE        {
                            NO_RESULT=0,
                            SLEW_RESULT=1,
                            INTRINSIC_RESULT=2,
                            SETUP_RESULT=3
                            HOLD_RESULT=4,
                            MPW_RESULT=5
                            RECOVERY_RESULT=6
                            REMOVAL_RESULT=7
                            LAST_RESULT=8 };
union ParmUnion
    {
    double Double;
    int Int;
    bool Bool;
    void *Pointer;
    };
private:
ENV_PARM_TYPE *ParmEnvArray;
ParmUnion *ParmEnvUnion;
PIN_PARM-TYPE **ParmPinArray
ParmUnion ** ParmPinUnion
RESULT_TYPE ** ParmResultArray;
ParmUnion ** ResultUnion;
bool ParmSelfAllocated, UnionSelfAllocated;
unsigned NumArcsAllocated, NumPins;
void DeallocateParms ();
void DeAllocateUnions();
public:
    ParameterBlock ();
    ParameterBlock (const BaseRule *Rule);
    ParameterBlock (unsigned NumberArcsInRule, unsigned NumberPins);
    virtual ~ParameterBlock();
virtual void Allocate (const BaseRule *Rule);
virtual void Allocate (unsigned NumberArcsInRule, unsigned Number Pins);
unsigned Depth () const;
unsigned Width () const;
void Assign   (unsigned NumberArcs, unsigned NumberPins);
void Assign   (ParmUnion *EnvParmArray,
            ParmUnion **PinParmArray,
            ParmUnion **ResultArray);
void Assign   (ENV_PARM_TYPE *EnvArray,
            PIN_PARM_TYPE ** PinArray,
            RESULT_TYPE ** Result Array);
ENV_PARM_TYPE *EnvParameters () const;
PIN_PARM_TYPE *PinParameters () const;
PIN_PARM_TYPE *PinParameters (unsigned Index) const;
RESULT_TYPE **ResultParameters () const;
RESULT_TYPE * ResultParameters (unsigned Index) const;
ParmUnion *EnvValues () const;
ParmUnion **PinValues () const;
ParmUnion * PinValues (unsigned Index) const;
ParmUnion ** ResultValues () const;
ParmUnion *ResultValues (unsigned Index) const;}
```

In Table 1, class BaseRule defines a basic rule, which may be used. And class Parameterblock defines a plurality of functions as routines including a method BaseObject to operate on a parameter block interface for a model comprising the basic rule. As depicted, three ParmUnion*ResultValues (unsigned Index) const; parameter blocks (PIN_PARM_TYPE, ENV_PARM_TYPE and RESULT_TYPE) are used for at least two purposes. The first purpose is to query a rule to determine what fields need to be filled in such that the rule can be evaluated. For instance, the parameter blocks can be used to evaluate arc rules, path rules, and cone rules. The second purpose of the parameter block is to provide a means of passing this data into the rule to be evaluated. For example, suppose that one rule wanted the input transition time parameter ($T_{in}$) and the capacitance load parameter ($C_L$) an input transition time parameter ($T_{in}$) and a capacitive load parameter ($C_L$) an input transition time parameter ($T_{in}$) and a capacitive load parameter ($C_L$) to be passed in while a second rule wanted the voltage parameter (V) to be passed as well. These parameters cannot be specified as a function call parameters to a function because the function call parameters would need to be resolved at compile time (i.e., one cannot load just any library into memory and expect it to run). As by passing only a parameter block into every evaluation call, and filling the contents of the parameter block dynamically based on the requirements of a given rule, loading of a library may be readily accomplished.

The function Allocate ( ), as shown in the Table 1, allocates memory dynamically to support the rules. These routines are virtual in case a deriving class needs to use a different memory allocation scheme (other than new). To return the dimensionality of the parameter block, functions Depth ( ) and Width ( ) are used in the Table 1. In particular, the function Depth ( ) shows how many arcs are allocated for the parameter block. Similarly, the function Width ( ) shows how wide is each parameter array.

The first usage of Assign ( ) function, in the Table 1, is to pass in the dimensionality of the array, in the event that the memory is all assigned by the calling routine. The second usage of the function Assign ( ) is to assign caller memory to the parameter block. The application (not this class) can be responsible for passing memory to the parameter block, which will be used to perform queries and evaluations. The third usage of the function Assign ( ) is for the application to pass in memory to the parameter block as the argument set. The parameter block sets flags within this memory array(s) to indicate what data is needed in order to perform the rule or check and the location where it may be placed. The size of the array for EnvParmArray or EnvArray is determined by LAST_ENV_PARM. If the rule or check needs temperature, the arrays may look like the following: EnvArray [TEMP_ENV_PARM]=TEMP_ENV_PARM and EnvParmArray [TEMP_ENV_PARM]= <temperature>.

The contents of EnvArray are set by the rule or check to indicate that EnvParmArray should contain a temperature value. It is to be understood that array values for pins and results are somewhat more complicated, but may be similarly derived. In one embodiment, a function cell may be included within the rule or check that indicates how many evaluations will be performed; NumParametersRequired ( ). The first dimension for pin and result arrays in the Assign ( ) and Query ( ) functions is a number between ( ) and that NumParametersRequired ( )-1. Cones, for example, may have 4 different arcs to be evaluated, so the first dimension could be 4. The second dimension is bounded by the number of pins in a device. In queries, the array will be set to indicate what type of data needs to be passed into the pin array and what type of data may be calculated as a result of the rule or check. Consequently, the plurality of routines incorporating contents of Table 1 may be used by one or more rules to get to desired data so that results can be calculated.

Example 2

Figure 8A:
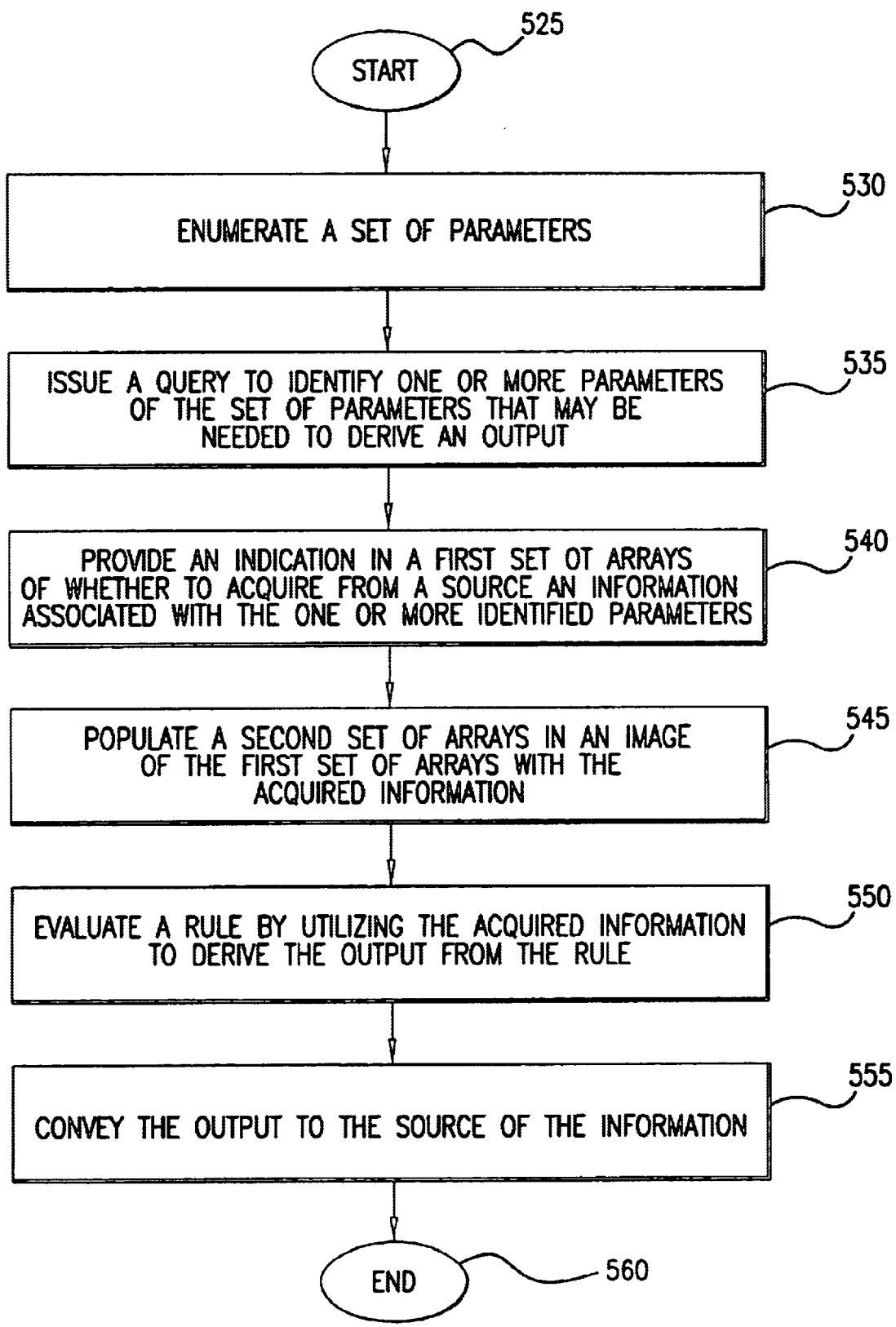
FIG. 8A illustrates a flow diagram of a process that can be implemented by a computer program consistent with an embodiment of the invention.

FIG. 8A illustrates a flow diagram of a process that can be implemented by a computer program, representing an embodiment of the invention. Referring to FIG. 8A, a sequence of method steps will be described in the form of a flow chart. The sequence of method steps is merely an example of a way in which the invention could be embodied. After a start 525, a set of parameters is enumerated at 530. Using the TPBI 450 for communication, a query is issued to identify one or more parameters of the set of parameters that may be needed to determine an output at 535. At 540, an indication is provided in a first set of arrays of whether to acquire from a source an information associated with the one or more identified parameters. At 545, a second set of arrays in an image of the first set of arrays is populated with the acquired information. A rule is evaluated by utilizing the acquired information to derive the output from the rule at 550. Finally, the derived output is conveyed to the source of the information before reaching end 560.

In one embodiment of the invention, according to one aspect, when the EDA model library 310 (loader and/or a plug-in) interacts with the EDA application 305, the EDA application 305 queries EDA model library 310 for a variable such as the variable "A." In response, EDA model library 310 finds the EDA model plug-in 315 (rule) to calculate the variable "A." Using callbacks, the EDA model library 310 (loader) figures out whether it is a pre-layout mode or a post-layout mode, or whether to get an effective capacitance $C_{eff}$ or a total capacitance $C_{total}$. The parameter passing mechanism employs two function calls, including but not limited to, the query ( ) function call 455 from the EDA model library 310 to the EDA model plug-in 315 (regarding what are required parameters), and the evaluate ( ) function call 460 from the EDA model library 310 to the EDA model plug-in 315 (regarding passing the required parameters).

In one embodiment, for one result to the EDA application 305, multiple answers may be needed from the EDA model plug-in 315. First, multiple rules may be identified. Then each one of them may be evaluated. Finally, the one result may be returned as a collective answer using the multiple number of callbacks from the EDA model library 310 to the EDA model plug-in 315.

There are many advantages associated with making the rule substantially small or tight requiring minimal code. EDA model plug-in 315 can be readily devised to be significantly isolated and relatively simple to write as it uses a known set of parameters. Consequently, the EDA model plug-in 315 does not have to change very often unless the algorithm to calculate the variable "A" is changed.

A rule (EDA model plug-in 315) is a formulation, which indicates to the EDA model library 310 what parameters are needed to calculate the answer. So if an application (the EDA application 305) desires to use a function, then the EDA application 305 communicates with the EDA model library 310 for arriving at the answer by processing the function.

In order to evaluate a rule, an exemplary rule may require an input set of parameters including an input transition and/or a capacitive load to calculate the delay between a particular input pin and an output pin. The exemplary rule may be independent as to how to acquire the input set of parameters and/or what particular types of parameters are needed.

For instance, the exemplary rule may not be concerned with the type whether the capacitive load is the total load or an effective load, as the exemplary rule is only concerned with providing a delay calculation between the particular input and output pin based on the input transition time and the load being driven. More specifically, the exemplary rule does not care whether the capacitive load being passed as a parameter to the rule is effective capacitance, a total capacitance, an approximation of load, or a wireload. In other words, the exemplary rule is not concerned with the original type of the capacitive load. Instead, for a provided capacitive load and a provided input transition time, the exemplary rule will provide the delay between the particular input and output pins as an answer or result in response to the input set of parameters.

Conversely, in an OLA-based structured approach employing callbacks when the EDA model plug-in 315 communicates to EDA model library 310 that it needs an input transition time information and/or a capacitive load information, the EDA model library 310 may ask the EDA model plug-in 315 a variety of questions including, whether $C_{eff}$, $C_{total}$ or wireload is needed for calculation efficiency. Therefore, in such a structured approach using callbacks, the EDA model library 310 may have to traverse through a list of questions/queries to arrive at a desired answer. A rule evaluation process may include plurality of nested loops having a time-consuming loop being on the innermost loop. The innermost loop may be executed every time any external loop is executed, thereby slowing down the whole process as opposed to be executed only once if the time-consuming innermost loop may be moved higher in the hierarchy of the nested loop. However, the source of the input set of parameters may be irrelevant to the exemplary rule, as for evaluation purposes only the value of the input set of parameters is employed for appropriately formulating the answer or result.

Thus, a goal is for the rules (EDA model plug-in 315) to be architecturally small, fast, tight, and/or clean for efficiency, as they are typically executed in the innermost loop or call. For example, a rule employed to calculate the delay may be executed every time a capcitive load is changed. Another goal is to provide process separation for the EDA model plug-in 315. Such process separation provides an ability to debug a session without having any speed penalty. Thus, the evaluation process of a rule should not make any difference to a rule to the location of the rule in a particular process. A yet another goal is to insulate the EDA model plug-in 315 from changes. For example, if a new callback is added, then there may not be any need to rewrite the rule (EDA model plug-in 315). Accordingly, the burden to create the rules is significantly reduced and for ASIC vendors that provide ease in testing the rule as opposed to the case with callbacks based technique.

For instance, in electronic design automation (EDA) tool suite, for modeling purposes, a set of potential parameters can be enumerated in advance. This enumeration is generally done prior to the use of such parameters by multiple EDA application programs, as a user may be able to enumerate the set of potential parameters. Such set of potential parameters may be accessed to be operated on by one or more of the multiple EDA application programs. In an optimized rule, a tight formulation of the answer is derived through a relatively quick binary search. The tight formulation could entail writing a small function, such as being a 24 value polynomial. In response to a set of coefficients provided for the polynomial, the small function can generate an answer. For example, the answer may be provided for a given cell delay, coefficient, values to be plugged in and stimuli. The answer is evaluated without caring about the source of the parameters. Therefore, such an optimized rule can be provided to a customer for coding within a model without dealing with callbacks.

Referring again to FIGS. 5, 6A, 6B and 7, as an example, if the EDA application 305 knows that EDA model library 310 can calculate a variable "A," then EDA model library 310 can enumerate a list of parameters that it needs in order to calculate the variable "A." In response to a request from the EDA application 305 to the EDA model library 310 for evaluating the variable "A," a fixed set of potential parameters is identified that EDA model library 310 may request from EDA application 305 for calculating the variable "A" or at least the EDA model library 310 can be assured that EDA application 305 would provide an affirmative response to such request, thereby obviating unproductive callbacks between the EDA application 305 and EDA model library 310 for exchanging parameters. The EDA model library 310 employs the EDA model plug-in 315 to enumerate the fixed set of potential parameters and for calculating the variable "A." Finally, the result of such calculation for the variable "A" is provided to the EDA application 305.

In the enumeration or type portion of the TPBI 450, the bits are set in the first set of arrays to indicate what parameters are needed by the rule. In the value portion of the TPBI 450 having the second set of arrays being the mirrored image of the first set of arrays, values for the parameters corresponding to bits set on the type portion may be filled accordingly. The first and second set of arrays each may comprise an environment array, a pin array and a result array. The length of the pin array defines the number of arches evaluated. Each location of the pin array may be pointed to another array having a length corresponding to number of pins.

More specifically, using the type environment array 475 from TPBI 450 comprising a set of environment parameters, EDA model library 310 queries EDA model plug-in 315 to determine what it needs in order to evaluate variable "A." The EDA model plug-in 315 may reply to EDA model library 310, the voltage parameter (V) and the process parameter (P) are required. Then the rule (EDA model plug-in 315) accesses the type environment array 475 to set a voltage flag and a process flag such as bits from "0" to "1" indicating to the EDA model library 310 that voltage and process information is desired to calculate the variable "A." EDA model library 310 checks the flag status in the type environment array 475 to determine what parameters are desired by the EDA model plug-in 315. More particularly, the state of bit may indicate whether a particular parameter is seeked for evaluations of a particular rule. The set of environment parameters can be predetermined as they can enumerated. Thus, the size of the type environment array 475 may be fixed, although it may include multiple instances of some parameters.

In particular, the EDA model plug-in 315 (rule) fills out the first set of arrays with bits corresponding to parameters desired from the EDA model library 310 in order to evaluate the rule. The bits indicate to the EDA model library 310 that EDA model plug-in 315 needs values for the parameters having the respective bits set as all the types of the values needed may be readily enumerated. Thus, queries are implemented to have the first set of arrays selectively filled by the EDA model plug-in 315 (rule). In response, callbacks are performed between the EDA model library 310 and the EDA application 305 to set these values, which are populated within the second set of arrays being the mirror image of the first of arrays. The length of the type environment array 475 indicates the number of parameters enumerated that are slated to be selectively paired between two programs such as EDA model library 310 and the EDA model plug-in 315.

By examining the timing arch AR0 422 of type pin array 480, EDA model plug-in 315 may indicate to EDA model library 310 that the input transition time ($T_{inLH}$) while going low to high at the input pin A 405, but for the input pin B 410 nothing may be needed, and at the output pin Y 415, the capacitance load parameter ($C_L$) could be required. Likewise, other timing arches including the timing arch AR1, 424 through AR3, 428 may be processed.

If only a subset of parameters from a predetermined set of parameters need to be used, the subset of parameters is enumerated. For example, if only ($T_{in}$) and ($C_L$) parameters are used, the subset comprises the ($T_{in}$) and ($C_L$) parameters out of the predetermined set of parameters included in the type environment array 475. In the first set of arrays, the input transition time ($T_{in}$) on the input pin A 405 may be readily located as it appears on a position "0" of the type pin array 480 which advantageously corresponds to the input pin A 405 of the cell X 420.

Since the second set of arrays is a mapped image of the first set of arrays parameters may be obtained by utilizing a same index order for both the first and second set of arrays. Next, the mapped value environment array 490 and the mapped value pin array 495 are populated by EDA model library 310, for example, using callbacks to the EDA application 305. Finally, the EDA model plug-in 315 fills the mapped value result array 500.

An integrated circuit may be designed and/or verified in accordance with the method steps of FIG. 8A. The set of programs includes a loader program, a model library program and a model program. Each program is preferably a computer program comprising a set of instructions (program code) encoded on computer-readable medium.

Example 3

Figure 8B:
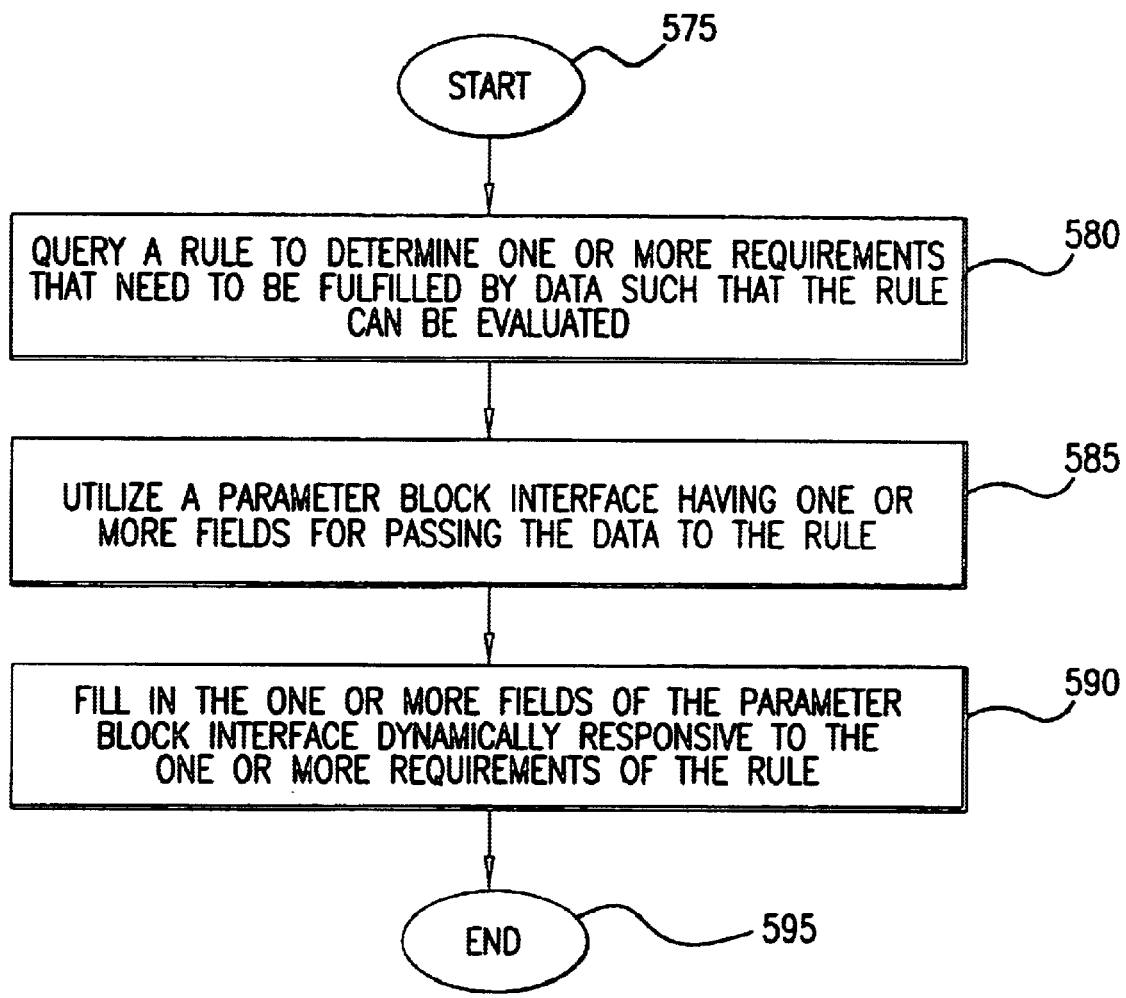
FIG. 8B illustrates a flow diagram of another process that can be implemented by a computer program consistent with an embodiment of the invention.

FIG. 8B illustrates a flow diagram of another process that can be implemented by a computer program, representing another embodiment of the invention. Referring to FIG. 8B, a sequence of method steps will be described in the form of a flow chart. The sequence of method steps is merely an example of a way in which the invention could be embodied. After a start 575, a rule is queried to determine one or more requirements that need to be fulfilled by data such that the rule can be evaluated at 580. At 585, a parameter block interface such as TPBI 450 having one or more fields is employed for passing the data to the rule. Finally, at 590, the one or more fields of the parameter block interface are filled in dynamically according to the one or more requirements of the rule before reaching end at 595.

An integrated circuit may be designed and/or verified in accordance with the method steps of FIG. 8B. The rule includes a function and/or a core algorithm. Each rule is preferably a computer program portion comprising a set of instructions (program code) encoded on computer-readable medium.

Practical Applications of the Invention

A practical application of the invention that has value within the technological arts is creating and verifying the design of an integrated circuit. Further, the invention is useful in conjunction with integrated circuit design optimization. For example, the invention enables an efficient interaction between a design library and one or more design tools.

In the semiconductor industry, multiple installed application programs such as software products for electronic design automation may interface with a loader interacting with a model comprising one or more rules. More specifically, for integrated circuits (ICs) using deep submicron process has led to the development of an open architecture named Open Library API (OLA). Although OLA provides a comprehensive Application Procedural Interface (API) that can be used by Electronic Design Automation (EDA) tools for the determination of cell and interconnect timing and power characteristics of ICs, performing unnecessary procedures such as calls and/or callbacks, providing all the variables required for evaluating a rule, or use of a stack could cause significant degradation of system performance. There are virtually innumerable uses for the invention, all of which need not be detailed here.

Advantages of the Invention

A computer program, representing an embodiment of the invention, can be cost effective and advantageous for at least the following reasons. The invention facilitates efficient parameter passing, multiple parameter support, selective parameter exchange to provide extendibility, ease of error handling, efficient recovery from an exception and translation of parameters for models incorporating multiple rules in design tools from multiple EDA vendors.

The invention permits the passing of a parameter that is to be used multiple times in the evaluation of a rule to be passed once instead of multiple times. The invention permits parameter passing en masse. The invention permits a parameter that is to be used in the evaluation of multiple rules to be passed once instead of multiple times thereby yielding significant time savings. The invention permits efficient parameter passing for a model having one or more rules for serving multiple applications. Efficient evaluation of a rule, which calculates and/or models delay, power, and other silicon device characteristics, without incurring excessive overhead is an important advantage compared to approaches that do not efficiently conduct parameter passing for rule evaluation.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be combined in the disclosed configuration, but could be combined in virtually any configuration. Further, although the plug-ins described herein can be separate modules, it will be manifest that the plug-ins may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

For example, within an EDA environment having disparate EDA applications, while using a known Application Procedural Interface (API) with a set of predefined callbacks or calling routines, absent a protocol specification, the invention advantageously provides very efficient parameter passing between a shared entity such as a model and an application program to evaluate a rule.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended sub-claims.

What is claimed is:

1. A method for passing parameters between program portions comprising:

enumerating a set of parameters;

providing, by a third program portion, an indication for each of the set of parameters in a first set of arrays of whether to acquire from a first program portion an information associated with one or more parameters of the set of parameters, in response to a second program portion issuing a query to the third program portion for identifying the one or more parameters;

populating a second set of arrays in an image of the first set of arrays with the information received from the first program portion associated with the one or more parameters, in response to a request from the second program portion;

evaluating the third program portion by utilizing the information associated with the one or more parameters from the second set of arrays to derive an output from the third program portion for return to the second program portion; and conveying the output from the second program portion to the first program portion.

2. The method of claim 1, wherein providing the indication includes setting a respective flag to either a first value or a second value in the first set of arrays for each of the set of parameters by the third program portion.

3. The method of claim 2, the first value indicating to the second program portion to seek the information associated with the one or more parameters, and the second value indicating to the second program portion not to seek the information associated with the one or more parameters.

4. The method of claim 3, wherein populating with the information includes filling a value obtained from the first program portion in the second set f arrays corresponding to the one or more parameters with their said flags having the first value.

5. The method of claim 4, the value for each of the one or more parameters of the set of parameters is loaded in a location in the second set of arrays responsive to said query to third program portion for determining a type of data required at said location.

6. The method of claim 1, wherein the first program portion includes an application program for electronic design automation.

7. The method of claim 1, wherein the second program portion includes an operable interface to interact with the first program portion.

8. The method of claim 1, wherein the third program portion include a model having a plurality of rules for use with the first program portion.

9. The method of claim 8, wherein the model includes one or more active models, each active model having a dataset and an algorithmic content.

10. The method of claim 8, wherein the plurality of rules includes a plurality of non-application specific core algorithms, each non-application specific core algorithm having one or more application specific functions associated with the first program portion.

11. The method of claim 10, wherein the plurality of rules includes an electrical characteristic rule to determine a performance metric of an under test circuit.

12. The method of claim 1, wherein the first program portion communicates with the third program portion through the second program portion utilizing a parameter block interface.

13. The apparatus of claim 12, wherein the parameter block interface is used to evaluate said one or more parameters either for a single element or for a plurality of elements.

14. The method of claim 1, wherein the first program portion communicates with the second program portion utilizing one or more transactions and the second program portion communicates with the third program portion through at least one query call and at least one evaluate call.

15. The method of claim 14, wherein the second program portion communicates with the third program portion through one or more said query and evaluate calls in a shared workspace.

16. An electronic media, comprising a program for performing the method of claim 1.

17. A computer program, comprising computer or machine-readable program elements translatable for implementing the method of claim 1.

18. The method of claim 1, further comprising verifying a design of an integrated circuit.

19. A method for passing parameters between program portions comprising:

enumerating a parameter block having a first plurality of parameters for selectively filling a first data structure and a second data structure and second plurality of parameters for selectively filling the first data structure and the second data structure, both the first data structure and the second data structure having an index order such that said second data structure is a mapped image of said first data structure, wherein both the first data structure and the second data structure includes a first plurality of arrays and a second plurality of arrays;

providing, by a third program portion, a first indication in the first plurality of arrays of said first data structure of whether to acquire from a first program portion a dataset associated with said first plurality of parameters, in response to one or more queries being issued from a second program portion to the third program portion for identifying the first plurality of parameters;

providing, by the third program portion, a second indication for each of the second plurality of parameters in the second plurality of arrays of said first data structure for identifying said second plurality of parameters to the second program portion, in response to receipt of said one or more queries at the third program portion;

populating the first plurality of arrays of said second data structure with the dataset, in response to one or more transactions performed between the first and second program portions;

evaluating the third program portion by utilizing the dataset and the second indication to derive an output data from the third program portion for return to the second program portion;

populating the second plurality of arrays of said second data structure with the output data received from the third program portion; and extracting the output data from the second plurality of arrays of said second data structure for return to the first program portion.

20. The method of claim 19, wherein the first plurality of arrays of said first data structure includes one or more predetermined parameter types and the second plurality of arrays of said first data structure includes a result parameter type.

21. The method of claim 19, wherein the first plurality of arrays of said second data structure includes one or more predetermined parameter values and the second plurality of arrays of said second data structure includes a result parameter value.

22. The method of claim 19, wherein each of said first plurality of arrays of said first and second data structures having a first dimensionality determined dynamically, in response to the first plurality of parameters, and each of said second plurality of arrays of said first and second data structures having second dimensionality determined dynamically, in response to the second plurality of parameters.

23. An electronic media, comprising a program for performing the method of claim 19.

24. The method of claim 19, further comprising of an integrated circuit.

* * * * *

UNITED STATES PATENT AND TRADEMARK OFFICE
CERTIFICATE OF CORRECTION

| | | |
|---|---|---|
| PATENT NO. | : 6,862,600 B2 | Page 1 of 1 |
| APPLICATION NO. | : 09/863809 | |
| DATED | : March 1, 2005 | |
| INVENTOR(S) | : Croix et al. | |

It is certified that error appears in the above-identified patent and that said Letters Patent is hereby corrected as shown below:

Title page, in the abstract, line 6, delete "query t" and insert --query to-- therefor.

Title page, in the abstract, line 8, delete "second et" and insert --second set-- therefor.

In claim 4, column 19, line 43, delete "set f" and insert --set of-- therefor.

In claim 8, column 19, line 58, delete "include" and insert --includes-- therefor.

In claim 14, column 20, line 12, delete "transactions" and insert --transactions,-- therefor.

In claim 19, column 20, line 39, after "indication", insert --for each of the first plurality of parameters--therefor.

In claim 22, column 22, line 3, after "having", insert --a--therefor.

Signed and Sealed this

Eighteenth Day of September, 2007

JON W. DUDAS
*Director of the United States Patent and Trademark Office*